United States Patent [19]

Rubenstein et al.

[11] 4,213,511

[45] Jul. 22, 1980

[54] CONSTANT FLOW HYDRAULIC SYSTEM

[75] Inventors: Raymond D. Rubenstein, La Grange Park; Charles L. Rescorla, Westmont, both of Ill.

[73] Assignee: International Harvester Company, Chicago, Ill.

[21] Appl. No.: 5,402

[22] Filed: Jan. 22, 1979

[51] Int. Cl.³ ............................................. B62D 5/06
[52] U.S. Cl. ..................................... 180/139; 60/420; 60/450
[58] Field of Search ............... 180/133, 134, 139, 141; 60/386, 450, 452, 484, 420

[56] References Cited

U.S. PATENT DOCUMENTS

| | | | |
|---|---|---|---|
| 4,022,023 | 5/1977 | Inaba et al. | 60/484 |
| 4,034,563 | 7/1977 | Orth | 60/484 |
| 4,047,590 | 9/1977 | Hoashi et al. | 180/139 |

Primary Examiner—John J. Love
Assistant Examiner—Donn McGiehan
Attorney, Agent, or Firm—Ronald C. Kamp; F. David AuBuchon

[57] ABSTRACT

A variable displacement pump is compensated to provide a relatively constant predetermined flow of hydraulic fluid under pressure to an open-center hydrostatic steering system, as the speed of the engine driving the pump varies, and a relief valve by-passes the steering system whenever the steering system would normally reduce the flow to hydraulic apparatus connected in series with and downstream of the steering system.

2 Claims, 1 Drawing Figure

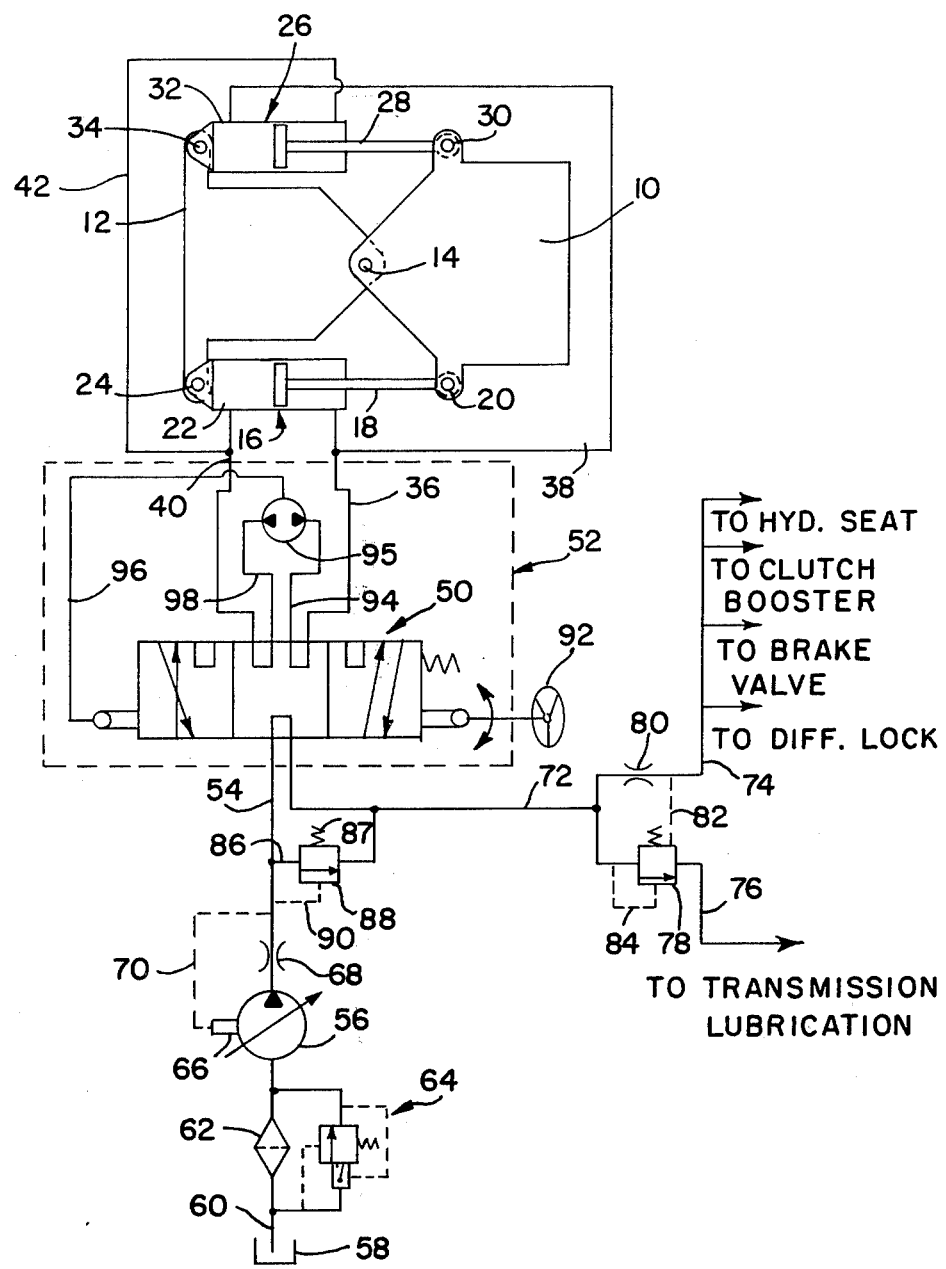

CONSTANT FLOW HYDRAULIC SYSTEM

BACKGROUND AND SUMMARY OF THE INVENTION

In a farm tractor it is desirable to provide the operator not only with steering capacity under all conditions, even when the engine is dead, but also with responsive steering at low engine speeds. In order to be responsive, i.e. to respond quickly to manual rotation of the steering wheel, the hydraulic system must be capable of supplying a predetermined minimum flow of hydraulic fluid under pressure to the steering system. Since the output of the pump in the hydraulic system is directly related to the speed of the engine driving the pump, it is obvious that the pump flow at the lowest engine speeds normally encountered during operation of the tractor will determine the poorest response in the steering system.

When a fixed displacement pump is used it should be sized so that its output at the aforementioned lowest speed will meet the predetermined minimum flow. Such a pump will be oversized for normal operation and at all but the lowest engine speeds will pump an excessive volume of fluid, which heats the hydraulic fluid necessitating larger oil coolers to maintain proper operating fluid temperatures, will generate higher noise levels, will require larger conduits connecting the steering system with the pump and reservoir, and will require more input horsepower resulting in higher fuel costs.

Use of a variable displacement pump would overcome many of the afortmentioned problems regarding the use of a fixed displacement pump. However, variable displacement pumps are seldom used in open-center hydraulic systems, because the compensator would tend to urge the pump toward maximum when, in reality, there was no need for additional pump output. The open-center type hydrostatic steering system is desirable because it is available commercially and because it more readily permits steering capability with the engine dead, and is easily adapted to utilize pump output for actuation of other hydraulic apparatus and for needed lubrication of critical tractor components.

It is also of significance that the recent trend is to tractors that steer by articulation of the frame. Such steering arrangements usually require a pair of steering cylinders having relatively large displacement volumes. The desired responsive steering in such tractors necessitate even higher minimum flows than is the case with comparably-sized tractors utilizing the more conventional two-wheel, Ackerman type steering.

It is, therefore, an object of this invention to provide a hydraulic system which overcomes most of the disadvantages normally associated with a fixed displacement pump, while permitting the use of a conventional open-center type hydrostatic steering system.

Further objects of this invention are to provide a hydraulic system which is relatively quiet in operation, which minimizes the size of conduits utilized therein, which is economical to construct and to operate, which minimizes heating of the hydrauic fluid during operation, and which permits use of common parts from open-center type hydraulic systems.

These and other objects of the present invention, and many of the attendant advantages thereof, will become more readily apparent from the following description and the accompanying drawing, wherein; the sole FIGURE is a schematic of a preferred embodiment.

DESCRIPTION OF A PREFERRED EMBODIMENT

Referring now to the drawing, there is shown a tractor represented by a front frame section 10 and a rear frame section 12 which are hinged together by pin 14 to permit steering of the tractor by articulation of the frame sections. A steering cylinder or jack 16 has its rod 18 pinned at 20 to the front frame 10 and its cylinder 22 pinned at 24 to the rear frame 12. A second steering cylinder or jack 26 is positioned on the other side of the tractor and has its rod 28 pinned at 30 to the front frame 10. The cylinder 32 of the jack 26 is pinned at 34 to the rear frame 12. A conduit 36 connects between the rod end of the cylinder 22 and the steering valve 50, with a branch conduit 38 interconnecting the head end of cylinder 32 and the rod end of the cylinder 22. A conduit 40 connects the steering valve 50 with the head end of cylinder 22, with branch conduit 42 interconnecting the rod end of cylinder 32 and the head end of cylinder 22. When hydraulic fluid pressure is directed through conduit 36, the jack 16 will be contracted, and the jack 26 will be extended to effect steering in one direction, assuming that conduit 40 is simultaneously connected to the reservoir. Similarly, when hydraulic fluid pressure is directed through conduit 40 while conduit 36 is connected to reservoir, jack 16 will be extended and jack 26 contacted to effect steering in the other direction.

The steering valve 50 is part of an open center hydraulic steering system, indicated generally at 52, to be more fully described hereinafter. Hydraulic fluid under pressure is supplied to the steering valve 50 through conduit 54 by a variable displacement pump 56, which draws fluid from a reservoir through a suction line 60 having a filter 62 interposed therein. A thermal by-pass valve, indicated at 64, is connected to direct fluid around the filter 62 when the oil is cold and its viscosity is high, and when the filter 62 becomes so dirty that adequate fluid flow is not permitted. The thermal by-pass valve is shown in more detail in U.S. patent application entitled FILTER THERMAL BYPASS VALVE by Raymond D. Rubenstein, Russell E. Janke and Charles L. Rescorla and having the same filing date and assignee as this application.

A compensator 66 is provided for the pump 56 to adjust its displacement. An orifice 68 is provided in the conduit 54 and a pilot line 70 connects between the compensator 66 and the conduit 54 downstream of the orifice 68. The compensator 66 provides both pressure and flow compensation, commonly referred to as load sensing. The pressure compensation limits the maximum system pressures, such as to 3000 psi, for example. The flow from the pump 56 is controlled by the flow portion of the pump compensator 66. A signal is fed back through pilot line 70. When a given pressure drop across the orifice 68 results, the compensator 66 will cause the pump 56 to stroke back, i.e. reduce displacement, and then maintain that pressure drop. In doing so, the pump will hunt slightly. This pressure drop will be set to produce the required flow from the pump 56 for responsive steering. Hence, when engine speed is reduced, the pressure drop across orifice 68 will be reduced and the signal through pilot line 70 will cause the compensator 66 to upstroke the pump, i.e. increase displacement, to maintain the set pressure differential and the corresponding flow. In this way, the required flow to the steering system is maintained up to the point at which the full displacement of the pump is reached, at which point steering flow will fall off in direct relationship to further reductions in engine speeds.

A return conduit 72 connects with the steering valve 50. When the valve 50 is centered, as shown in the drawing, all the flow through supply conduit 54 is directed into return conduit 72. Return conduit 72 branches into a primary branch conduit 74 and a secondary branch conduit 76. The primary branch conduit 74 supplies hydraulic fluid to a plurality of hydraulic apparatus, e.g. a differential lock, a brake valve, a clutch booster, a hydraulic seat, etc., while the secondary branch conduit supplies lubrication to the transmission or if desired other hydraulic apparatus of less critical importance.

A priority-type flow divider valve 78 is provided in the secondary conduit 78. A orifice 80 is interposed in primary conduit 74 and a pilot line 82 connects between the conduit 74 downstream of the orifice 80 and the valve 78. A second pilot line 84 connects between the valve 78 and the conduit 76 upstream of the valve 78. The signal in pilot line 84 opposes the signal from pilot line 82 and assures that the flow in conduit 72 will go to meet the requirements of the primary conduit 74 and secondary conduit 76 will receive the flow in excess of the primary conduits need.

A by-pass conduit 86 connects between the supply conduit 54 and return conduit 72. A by-pass valve 88 is interposed in by-pass conduit 86 and is spring biased by spring 89 to a closed position in which flow through conduit 86 is blocked. A pilot line 90 connects between the supply conduit 54 and the by-pass or relief valve 88, the signal from the pilot line 90 serving to urge the valve 88 against the bias of the spring 87 to an open position. The spring 87 is set to permit the valve 88 to open at a pressure which is less than the system pressure set by the pressure portion of the compensator 66. Thus, the by-pass valve 88 will be opened at a pressure which would cause the pressure portion of compensator 66 to destroke the pump 56. Hence, when the operator holds the steering wheel so that flow from the steering valve 50 into the return conduit 72 is precluded, the by-pass valve 88 will open and flow into the conduit 72 will be by way of the by-pass conduit 86.

In operation then, the pump compensator 66 will try to maintain some predetermined pressure drop across the orifice 68 which results in a predetermined flow through supply conduit 54 to the steering valve 50. When the steering valve is in its center neutral position, as shown in the drawing, the flow will go through the valve 50 and into return conduit 72 and from there to the branch conduits 74 and 76. The spring 87 will maintain the by-pass valve 88 closed.

When the operator rotates the steering wheel, indicated at 92, the steering valve 50 will be shifted to the right or left, as viewed in the drawing. For example, if the valve 50 is shifted to left, flow from conduit 54 will be directed to conduit 94 and will be metered through the hand pump 95 which is mechanically connected to rotate, through at a different rate, with the steering wheel 92; the line 96 representing the mechanical connection between steering wheel 92 and the hand pump 95. The flow metered through the hand pump 95 is directed to conduit 98 which connects with the steering valve 50. In its position as shifted to the left, i.e. the right hand block in the schematic, the steering valve 50 connects the conduit 98 with the conduit 40. Fluid pressure in conduit 40 will cause the jack 16 to extend and the jack 26 to contract, as explained previously, articulating the frames 10 and 12 and effect steering in one direction. The fluid exhausted from the rod end of jack 16 and the head end of jack 26 will be through conduit 36, through the steering valve 50 to the return conduit 72. Should the operator then hold the steering wheel 92 so that the hand pump is not rotating and therefore is incapable of metering any further flow to the jacks 16 and 26, flow in conduit 54 will be reduced momentarily. However, the flow conpensator 66 is set to maintain a predetermined flow and as the predetermined flow cannot be accepted by the steering system 52, the pressure in conduit 54 will increase. The increase in pressure will be communicated to the by-pass valve 88 through pilot line 90, causing the valve 88 to open. Flow through by-pass conduit 86 will be established immediately between supply conduit 54 and return conduit 72, so that the branch conduits 74 and 76 will receive an adequate supply of hydraulic fluid under pressure. When the by-pass valve 88 is open the entire return conduit 72 receives high pressure from the pump 56 which is communicated through the steering valve 50 to conduit 36 and hence to the rod end of jack 16 and the head end of jack 26. This pressure would tend to defeat the steering effort as directed by the operator's rotation of the steering wheel. However, as long as the operator holds the steering wheel and thereby does not rotate the hand pump 95, the steering jacks will remain hydraulically locked. As soon as the operator begins rotation of the steering wheel again, the pressure in pilot line 90 will drop and the spring 89 will close by-pass valve 88.

It will be seen from the foregoing that the present invention provides a constant flow hydraulic system that achieves all of the objects recited previously. While a preferred embodiment of the invention has been described herein, it will be appreciated that various changes and modifications may be made therein without departing from the spirit of the invention as determined by the scope of the appended claims.

What is claimed is:

1. A constant flow hydraulic system for a tractor having an engine, said hydraulic system comprising:
    a variable displacement pump driven by the engine and having a compensator for adjusting pump displacement to provide a relatively constant predetermined flow as engine speed varies;
    an open-center hydrostatic steering system connected to receive said flow;
    hydraulically-actuated apparatus connected in series with and downstream of said steering system;
    a relief valve connected to bypass said steering system so that said apparatus will receive pump flow under conditions in which said steering system would normally substantially reduce the flow thereto;
    said hydraulic apparatus being arranged in a preferred branch and a secondary branch; and
    a flow divider valve upstream of said branches and downstream of said steering circuit and said relief valve for assuring adequate flow to said preferred branch.

2. A constant flow hydraulic system for a tractor having front and rear frame sections pivotally interconnected to permit steering of the tractor by articulation of said frame sections and an engine mounted on one of said frame sections, said hydraulic system comprising:

a variable displacement pump driven by the engine and having a compensator for adjusting pump displacement to provide a relatively constant predetermined flow as engine speed varies;

an open-center hydrostatic steering system connected to receive said flow;

said steering system including a steering valve, a pair of steering cylinders pivotally connected between said front and rear frame sections, one cylinder on each side of said tractor, with a first conduit connected between said steering valve and the rod end of one cylinder and the head end of the other cylinder, and a second conduit connected between said steering valve and the rod end of said other cylinder and the head end of said one cylinder;

hydraulically-actuated apparatus connected in series with and downstream of said steering system;

a relief valve connected to bypass said steering system so that said apparatus will receive pump flow under conditions in which said steering system would normally substantially reduce the flow thereto;

said hydraulic apparatus being arranged in a preferred branch and a secondary branch; and a flow divider valve upstream of said branch and downstream of said steering circuit and said relief valve for assuring adequate flow to said preferred branch.

* * * * *